United States Patent
Crowe et al.

(10) Patent No.: US 9,481,248 B2
(45) Date of Patent: Nov. 1, 2016

(54) OPERATOR/PASSENGER SELECTIVE VEHICLE INSTRUMENT LOCKS

(71) Applicant: Lenovo (Singapore) Pte. Ltd., Singapore (SG)

(72) Inventors: John Scott Crowe, Durham, NC (US); Nathan J. Peterson, Durham, NC (US); Amy Leigh Rose, Chapel Hill, NC (US); Jennifer Lee-Baron, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 178 days.

(21) Appl. No.: 14/205,675

(22) Filed: Mar. 12, 2014

(65) Prior Publication Data

US 2015/0258894 A1     Sep. 17, 2015

(51) Int. Cl.
*B60K 37/00*     (2006.01)
*B60K 37/06*     (2006.01)

(52) U.S. Cl.
CPC ......... *B60K 37/06* (2013.01); *B60K 2350/901* (2013.01); *B60K 2350/903* (2013.01); *B60K 2350/906* (2013.01)

(58) Field of Classification Search
CPC ............ B60K 37/06; B60K 2350/901; B60K 2350/903; B60K 2350/906
USPC .......................................................... 701/36
See application file for complete search history.

(56) References Cited

U.S. PATENT DOCUMENTS

| | | | |
|---|---|---|---|
| 2009/0040193 A1* | 2/2009 | Geaghan ............... | G06F 3/0416 345/174 |
| 2012/0092148 A1* | 4/2012 | Santos ..................... | B60Q 1/50 340/438 |
| 2014/0015971 A1* | 1/2014 | DeJuliis ................. | H04N 7/181 348/148 |

* cited by examiner

*Primary Examiner* — Richard Camby
(74) *Attorney, Agent, or Firm* — Ference & Associates LLC

(57) ABSTRACT

An embodiment provides a method, including: receiving input via a sensor positioned within a vehicle; determining, using the sensor input, a passenger is within the vehicle; and analyzing the input received via the sensor to selectively disable a feature of an information handling device within the vehicle. In some embodiments, different sets of instruments or features thereof may be selectively disabled depending on the presence of a driver and/or passenger. Other aspects are described and claimed.

18 Claims, 4 Drawing Sheets

OPERATOR/PASSENGER SELECTIVE VEHICLE INSTRUMENT LOCKS

BACKGROUND

As vehicles become more complex and are provided with increased functionality, the level of potential driver distractions increases. For example, an increasing number of cars are being equipped with navigation systems, the ability to pair with mobile user devices, in car displays, etc. While these various instruments dramatically increase the user's ability to engage in a variety of activities, there is a corresponding increase in driver distraction.

Previous attempts have been made to limit the impact of such instrumentation on driver distraction. In one approach, the physical location of various elements, e.g., in car displays, has been chosen to limit the distance a user must look away to interface with the particular instrument. Another approach has been to implement many instruments that include a hands-free interface, e.g., a voice activation system. Still others have attempted to segregate out certain functionalities, e.g., precluding or blocking input to certain instruments such as a navigation system while the vehicle is being operated.

BRIEF SUMMARY

In summary, one aspect provides a method, comprising: receiving input via a sensor positioned within a vehicle; determining, using the sensor input, a passenger is within the vehicle; and analyzing the input received via the sensor to selectively disable a feature of an information handling device within the vehicle.

Another aspect provides a vehicle, comprising: a driver compartment; a passenger compartment proximately located to the driver compartment; an information handling device disposed within the vehicle; a sensor; a processor operatively coupled to the sensor and the information handling device; and a memory that stores instructions executable by the processor to: receive input via the sensor positioned within a vehicle; determine, using the sensor input, a passenger is within the vehicle; and analyze the input received via the sensor to selectively disable a feature of the information handling device within the vehicle.

A further aspect provides an apparatus, comprising: a processor; and a memory that stores instructions executable by the processor to: receive input via a sensor positioned within a vehicle; determine, using the sensor input, a passenger is within the vehicle; and analyze the input received via the sensor to selectively disable a feature of an information handling device within the vehicle.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
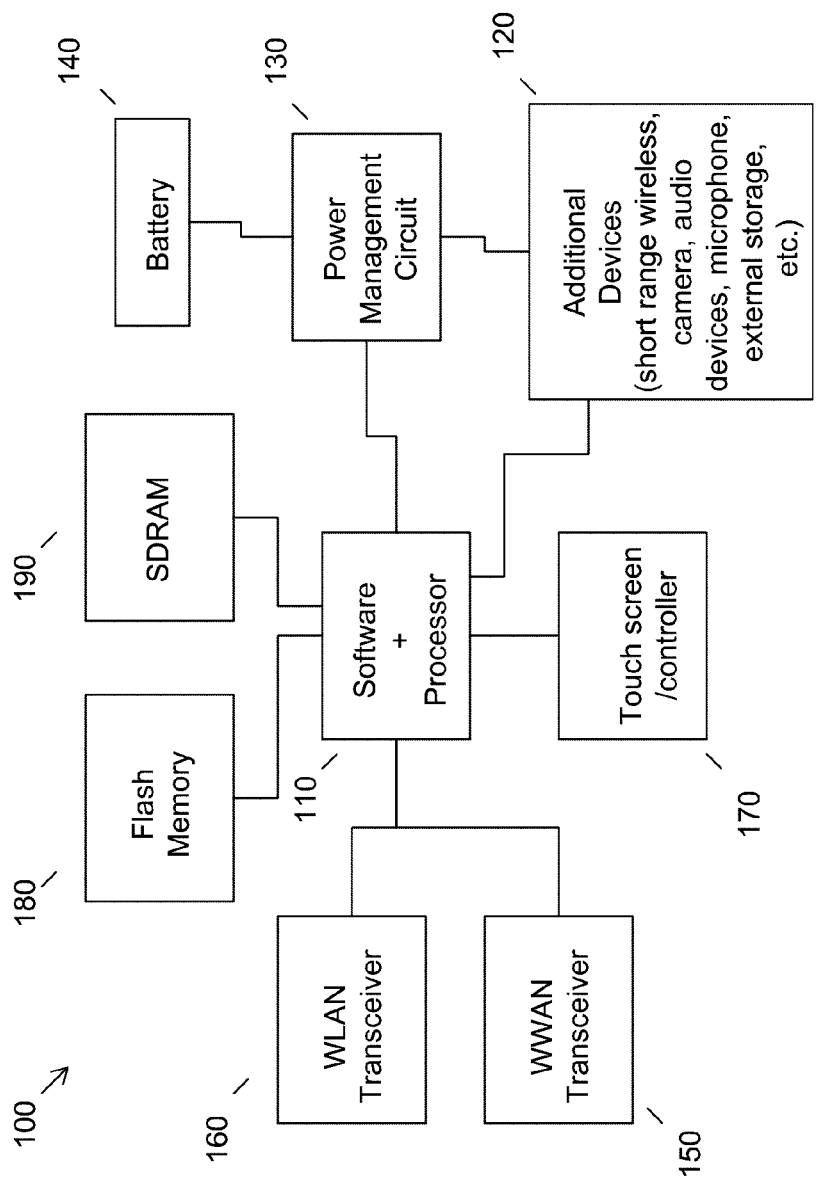
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Many vehicles with advanced electronic interface features (e.g., GPS, BLUETOOTH wireless communication pairing capabilities, etc.) attempt to lock or block certain features while the vehicle is in motion in an effort to prevent distraction for drivers. One difficulty with such an approach is that passengers that might safely use any instrument, including locked or blocked instruments, are unable to do so. Currently there are hacks available for some car systems but this then allows the driver to use the device while driving, creating a possibly dangerous scenario the lock was trying to avoid in the first place.

Accordingly, an embodiment intelligently determines if an instrument input should be disabled, e.g., via determining if the instrument input was received under safe conditions, such as via a passenger provided instrument input. If so, an embodiment may selectively commit an action associated with the input; otherwise, an embodiment may block or lock the instrument input and not commit the action. For example, an embodiment may use sensor inputs to determine if a driver has established contact with contact points, e.g., on the steering wheel in the standard hand positions. If such contact is detected, an embodiment may determine that an instrument input was issued via someone other than the driver, i.e., a passenger. In such a context an embodiment will detect when both hands of the driver are grasping the steering wheel and unlock instruments for the passenger to use. Various other embodiments are described throughout as non-limiting examples.

The illustrated example embodiments will be best understood by reference to the figures. The following description is intended only by way of example, and simply illustrates certain example embodiments.

While various other circuits, circuitry or components may be utilized in information handling devices, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a sensor such as a microphone, a camera, a positional sensor, etc. Commonly, system 100 will include a touch screen/controller 170 for data input and display. System 100 also typically includes various memory devices, for example flash memory 180 and SDRAM 190.

Figure 2:
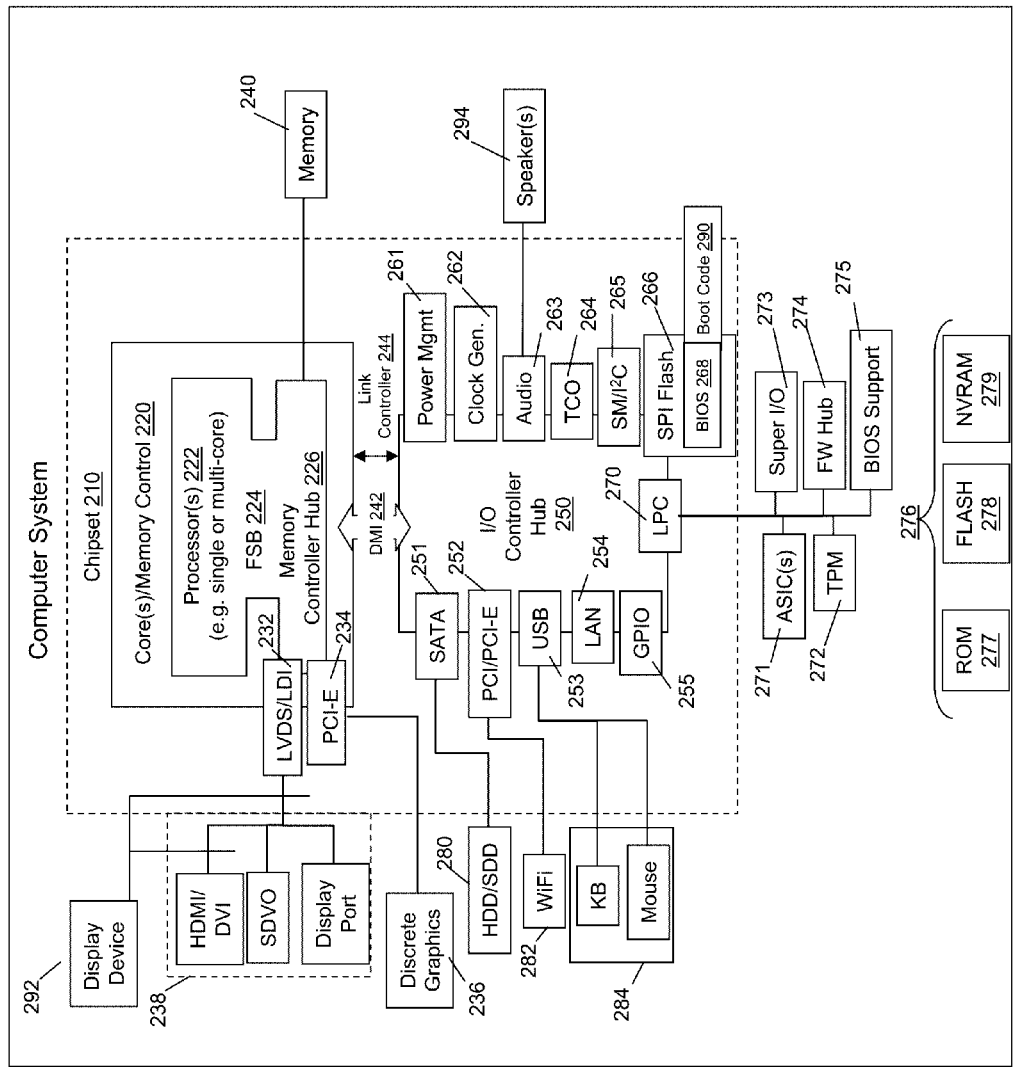
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits, or chips, that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, et cetera) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, sensors, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as an on-board computer in a vehicle that receives sensor inputs and instrument inputs. In an embodiment, such a device or apparatus intelligently manages the instruments such that they may be selectively locked depending on the type and nature of sensor and/or instrument inputs received, with a particular focus on whether a passenger is present and providing inputs.

Figure 3:
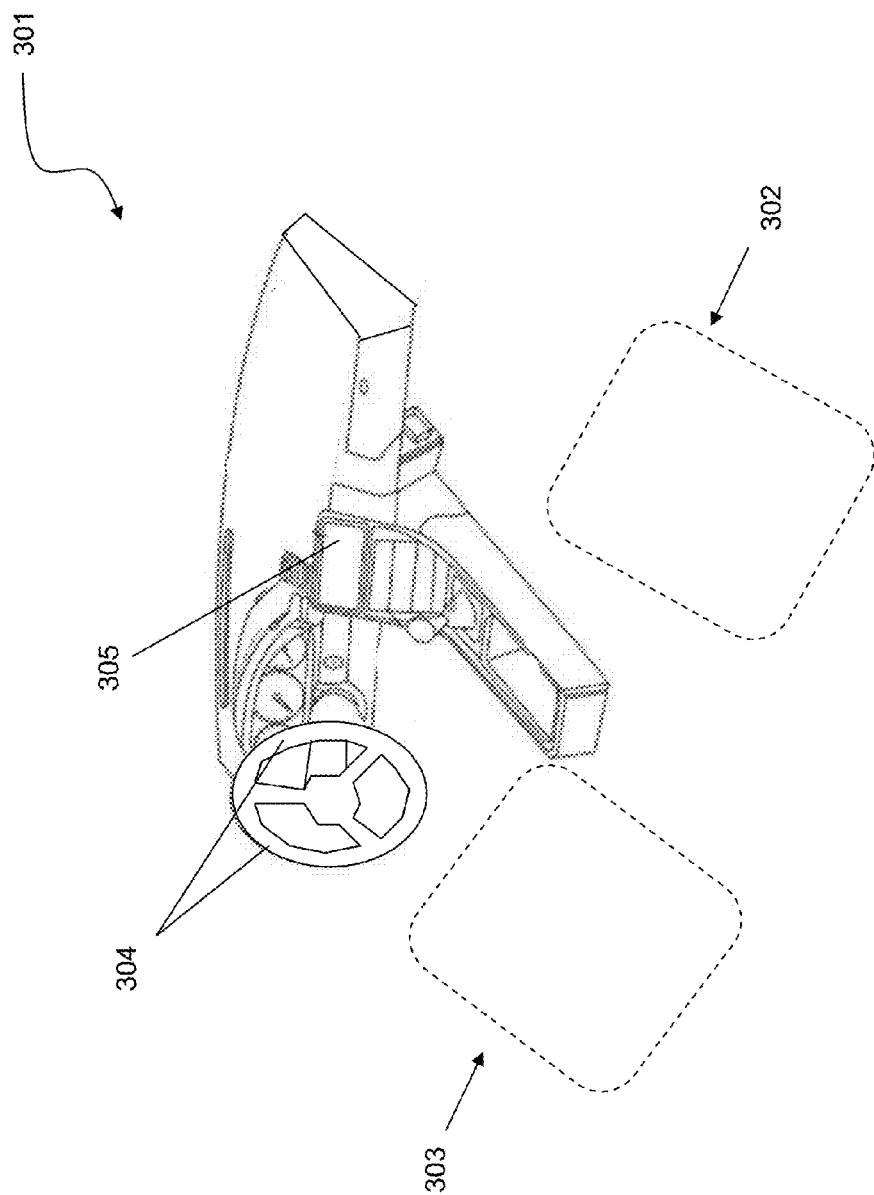
FIG. 3 illustrates an example vehicle interior.

By way of example, and referring to FIG. 3, an interior of a vehicle 301 is illustrated. The vehicle interior 301 accommodates various occupants, e.g., a passenger in a passenger compartment 302 and a driver in a driver compartment 303. In an embodiment, an operator specific management of vehicle instrument(s) 305 is implemented, e.g., GPS navigation systems, an interface pairing mobile devices using short range wireless communications, etc. For example, an operator or driver input to an instrument 305 may be blocked in certain circumstances whereas a passenger input to an instrument 305 may not be.

In an embodiment, one or more sensor inputs are used in order to determine if an instrument input should be disabled. For example, a sensor may monitor contact points of an element such as the steering wheel 304 to establish if a driver is appropriately operating the vehicle and not providing instrument input, e.g., contacting the steering wheel using two hands, at particular positions, etc. The sensor may be a single sensor such as a camera or may include multiple sensors, e.g., touch based sensors that sense contact. Additionally or in the alternative, one or more sensors may provide input to sense a passenger is located in the passenger compartment 302. In this way, an embodiment may utilize the inputs of one or more sensors to determine if a driver is located within the driver compartment 303 and additionally may sense more refined information, e.g., if the driver is contacting the steering wheel 304 at particular contact locations, if a passenger has provided input to the instrument 305, etc.

Figure 4:
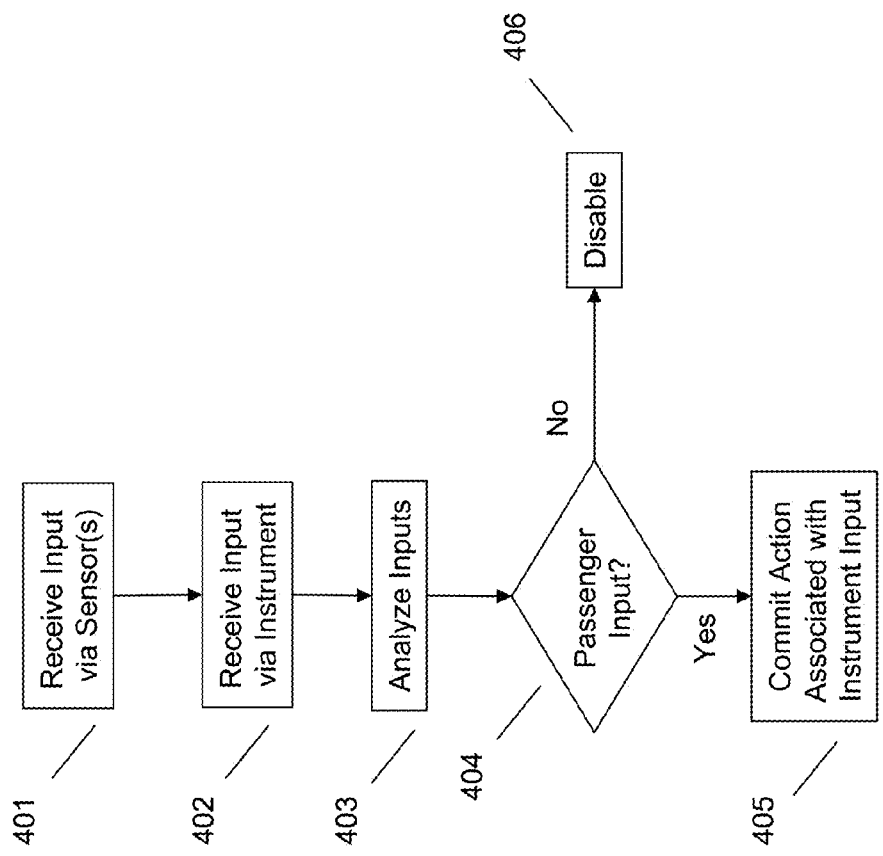
FIG. 4 illustrates an example method of providing selective operator/passenger vehicle instrument locks.

Referring to FIG. 4, an embodiment may utilize the sensor inputs to selectively lock or block certain instruments. An embodiment may receive input via a sensor positioned within a vehicle at 401. Optionally, an embodiment may also receive input via an instrument at 402 to be used in the analysis, although an embodiment may selectively lock or block instruments using the sensor input(s) alone. For example, an embodiment may receive sensor inputs via contact sensors of the steering wheel 304.

An embodiment analyzes the inputs received via the sensor at 403 to determine if an instrument should be selectively locked or blocked, which may include blocking an input received via the instrument is passenger input at 404 and/or setting or retaining an instrument in a locked setting. For example, an embodiment may map a combination of sensor inputs to determine a passenger has provided an input to an instrument. By way of example, two contact inputs to sensors disposed within the steering wheel 304 may be used to determine (e.g., mapped to a context) that an input to an instrument 305 located within a separate instrument panel has not been provided by the driver. In such a circumstance, an embodiment may thus unlock the instrument for passenger use, e.g., determine at 404 that the instrument input is passenger input and should be honored by committing the action at 405. Conversely, if an embodiment determines that the instrument should remain locked or be actively blocked, e.g., an embodiment determines that a passenger has not provided the input to the instrument, at 405 the instrument may remain locked or the input may be blocked such that the instrument input is not committed.

It should be noted that "blocking" and "locking" (and variations thereof) are used interchangeably such that an instrument may be disabled in an active or re-active fashion via blocking or disablement may result from setting and/or retaining the instrument in a locked setting. In an embodiment, an information handling device, e.g., an on board computer in a vehicle or an information handling device of a vehicle instrument, may be selectively disabled such that features of the information handling device, e.g., control of operatively coupled vehicle instrument(s), may be selectively disabled. In an embodiment, the number of features to be selectively disabled may vary depending upon sensor input(s), and in at least one embodiment a feature that is selectively disabled may include a general safety feature itself, i.e., disabling of a safety feature of an information handling device may enable all other features, i.e., enable vehicle instrument(s).

An embodiment may use other input(s), e.g., via a camera to make more direct determinations regarding the origin of the instrument input. For example, an embodiment may utilize image analysis of input from a camera or other image sensor to determine whether a driver or passenger has provided the instrument input and implement the appropriate action responsive thereto.

Additionally, an embodiment may implement various use modes depending on detection of a driver and/or passenger generally. For example, a first set of instruments may be subject to blocking/locking if only a driver is present whereas another set of instruments may be subject to blocking/locking if both a driver and a passenger is present. For example, an embodiment may utilize one or more sensor inputs to detect that only a driver is present in a vehicle and implement blocking of a set of instruments. An embodiment may detect that both a passenger and a driver are present using the sensor inputs and block another set of instruments.

In one example, a larger set of instruments may be blocked if both a driver and passenger are present with the understanding that the passenger may freely use the larger set of blocked instruments. Likewise, if only a driver is present, a smaller set of instruments may be subject to blocking with the understanding that a passenger will not be there to assist the driver. Other combinations of instruments to be blocked/locked based on the presence or absence of a passenger may be implemented.

Thus, an embodiment provides operator/passenger selective vehicle instrument locks. In an embodiment, sensor inputs regarding the driver and passenger may be used to intelligently determine if a driver or passenger has operated an instrument. In an embodiment, different instruments may be subject to blocking depending on the presence of driver/passenger within the vehicle.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving input via a sensor positioned within a vehicle;
    determining, using the sensor input, a passenger is within the vehicle;
    analyzing the input received via the sensor to selectively disable a feature of an information handling device within the vehicle;
    determining, using the sensor input, if input received via the information handling device is passenger input; and
    responsive to determining the input received is passenger input, committing an action associated with the disabled feature of the information handling device.

2. The method of claim 1, further comprising responsive to determining the input received via the information handling device is not passenger input, blocking an action associated with the information handling device input.

3. The method of claim 1, further comprising providing an indication that a feature of the information handling device has been disabled.

4. The method of claim 1, wherein the receiving input via a sensor comprises receiving sensor input indicative of a passenger positioned in a passenger compartment.

5. The method of claim 1, wherein the receiving input via a sensor comprises receiving sensor input indicative of a driver contacting an element in a driver compartment of the vehicle at predetermined positions.

6. The method of claim 5, wherein the predetermined positions are positions on a steering wheel of the vehicle.

7. The method of claim 1, further comprising establishing a set of instruments that are operable via the information handling device and that are selectively disabled.

8. The method of claim 7, further comprising adjusting the set of instruments that are selectively disabled using the input received via the sensor.

9. The method of claim 8, wherein:
    the adjusting comprises implementing a default wherein a number of features of the instruments that are selectively disabled is increased;
    the analyzing the input received via the sensor comprises determining if a passenger is providing the input to the information handling device; and
    responsive to determining the passenger provided the input, unlocking a feature that was selectively disabled.

10. A vehicle, comprising:
    a driver compartment;
    a passenger compartment proximately located to the driver compartment;
    an information handling device disposed within the vehicle;
    a sensor;
    a processor operatively coupled to the sensor and the information handling device; and
    a memory that stores instructions executable by the processor to:
    receive input via the sensor positioned within a vehicle;
    determine, using the sensor input, a passenger is within the vehicle;
    analyze the input received via the sensor to selectively disable a feature of the information handling device within the vehicle;
    determine, using the sensor input, if input received via the information handling device is passenger input; and
    responsive determination that the input received is passenger input, commit an action associated with the disabled feature of the information handling device input.

11. The vehicle of claim 10, wherein the instructions are executable by the processor to, responsive to determining the input received via the information handling device is not passenger input, block an action associated with the information handling device input.

12. The vehicle of claim 10, wherein the instructions are executable by the processor to provide an indication that a feature of the information handling device has been disabled.

13. The vehicle of claim 10, wherein to receive input via a sensor comprises receiving sensor input indicative of a passenger positioned in a passenger compartment.

14. The vehicle of claim 10, wherein to receive input via a sensor comprises receiving sensor input indicative of a driver contacting an element in a driver compartment of the vehicle at predetermined positions.

15. The vehicle of claim 14, wherein the predetermined positions are positions on a steering wheel of the vehicle.

16. The vehicle of claim 10, wherein the instructions are executable by the processor to establish a set of instruments that are operable via the information handling device and that are selectively disabled.

17. The vehicle of claim 16, wherein the instructions are executable by the processor to adjust the set of instruments that are selectively disabled using the input received via the sensor.

18. An apparatus, comprising:
    a processor; and
    a memory that stores instructions executable by the processor to:
    receive input via a sensor positioned within a vehicle;
    determine, using the sensor input, a passenger is within the vehicle; and
    analyze the input received via the sensor to selectively disable a feature of an information handling device within the vehicle
    determine, using the sensor input, if input received via the information handling device is passenger input; and responsive determination that the input received is passenger input, commit an action associated with the disabled feature of the information handling device input.

* * * * *